United States Patent [19]
Walsh

[11] Patent Number: 5,662,870
[45] Date of Patent: Sep. 2, 1997

[54] FLUID BED COOLING SYSTEM FOR POLYMER PROCESSING

[75] Inventor: John J. Walsh, Shoreview, Minn.

[73] Assignee: Hosokawa Bepex Corporation, Shoreview, Minn.

[21] Appl. No.: 563,180

[22] Filed: Nov. 27, 1995

Related U.S. Application Data

[62] Division of Ser. No. 496,762, Jun. 29, 1995, Pat. No. 5,536,880.
[51] Int. Cl.$^6$ ........................................... B01D 9/00
[52] U.S. Cl. ..................... 422/245.1; 117/206; 422/251
[58] Field of Search ..................... 117/200, 203, 117/204, 206; 422/245.1, 251, 252, 253, 254

[56] References Cited

U.S. PATENT DOCUMENTS

| | | | |
|---|---|---|---|
| 5,230,769 | 7/1993 | Jancie et al. | 422/245.1 |
| 5,410,984 | 5/1995 | Pikus et al. | 117/204 |
| 5,445,108 | 8/1995 | Schermutzki et al. | 422/254 |
| 5,454,344 | 10/1995 | Pikus et al. | 117/206 |

OTHER PUBLICATIONS

TorusDisc Dryer, Hosokawa Bepex Corporation Brochure Printed in the U.S.A.
Thermascrew Heat Exchangers, Hosokawa Bepex Corporation Brochure, Printed in the U.S.A.

*Primary Examiner*—Felisa Garrett
*Attorney, Agent, or Firm*—Rudnick & Wolfe

[57] ABSTRACT

A system for the solid phase polymerization of polymers wherein cold amorphous polymer is introduced to a crystallizer and heated to crystallize the polymer, the crystallized polymer is discharged to a reactor to achieve polymerization of the polymer, and the hot polymer product of the reactor is discharged to a fluid bed cooler for cooling of the polymerized product. The fluid bed cooler includes an inlet for the hot polymer and an inlet for the cooling gas, and the cooled polymer and the heated gas are discharged from the cooler after contact of the gas with the polymer. The cooler includes a bed portion through which the polymer moves while in contact with the cooling gas, and an upper chamber which collects the heated gas. The temperature of the polymer gradually decreases from the location of the inlet for the polymer to the location of the discharge for the polymer, and the gas in the upper chamber is hotter in the area of the upper chamber adjacent the inlet for the hot polymer than in the area of the upper chamber adjacent the discharge location of the cooled polymer. At least two outlets are defined by the upper chamber and a weir baffle is used to separate an upper chamber zone containing the hotter gas from the balance of the upper chamber. Hotter gas is then discharged to the reactor through an outlet communicating with the upper chamber zone containing the hotter gas.

6 Claims, 4 Drawing Sheets

FLUID BED COOLING SYSTEM FOR POLYMER PROCESSING

This is a divisional of application Ser. No. 08/496,762 filed on Jun. 29, 1995, now, U.S. Pat. No. 5,536,880.

BACKGROUND OF THE INVENTION

This invention relates to polymer processing systems which treat amorphous polyester to achieve crystallization followed by solid phase polymerization, followed by cooling. An example of such a system is found in Herron Patent No. 4,161,578.

In systems of the type contemplated by this invention, cold amorphous polymer material is fed to a crystallizer and, after substantial heat input, hot product is discharged. The particular apparatus for achieving the crystallization may comprise an indirect heat supply unit or a fluid bed. The SOLIDAIRE® or TORUSDISC® equipment manufactured by Hosokawa Bepex Corporation of Minneapolis, Minn. is an example of an indirect heat supply unit which may be utilized for achieving the crystallization. In such a system, steam or other heated fluid is passed through rotors and/or jackets which are in contact with the agitated polymer material. The polymer is thereby heated to the necessary temperature for achieving the crystallization reaction.

In a fluid bed system, for example units manufactured by Hosokawa Bepex, heated air is brought into contact with the polymer material in order to improve heat transfer and to achieve the temperatures required for the crystallization reaction.

In systems of the type described, the crystallized material is transferred to a reactor for achieving polymerization. Subsequent to the polymerization, the material is transferred to a cooler which may also comprise, for example, a TORUSDISC® or fluid bed system. Where a fluid bed cooler is employed, it has been the practice to achieve the cooling, at least in part, by contacting the hot material with cool gas which may be air or some other gas such as nitrogen. As a result, the gas is heated considerably and may then be recirculated only if first cooled. The expense of cooling is, however, only warranted where nitrogen or some other more expensive gas is being used.

SUMMARY OF THE INVENTION

This invention provides a system for polymer processing wherein greatly improved efficiencies are achieved in the operation of the cooling portion of the cycle. In particular, the system constitutes a process and apparatus for recirculation of gases used in a fluid bed cooling operation which greatly improves the efficiency of this operation.

The system of the invention comprises, in particular, an arrangement wherein solid phase polymerization is achieved by introducing cold amorphous polymer to a crystallizer to crystallize the polymer. The crystallized polymer is then discharged to a reactor for further heating to achieve polymerization of the polymer, and the hot polymer product of the reactor is discharged to a fluid bed cooler for cooling of the polymerized product. The fluid bed cooler includes an inlet for the hot polymer and an inlet for the cooling gas, and the cooled polymer and the heated gas are discharged from the cooler after contact of the gas with the polymer. The cooler includes a bed portion in which the polymer moves while in contact with the cooling gas, and an upper chamber which collects the heated gas. The temperature of the polymer gradually decreases from the location of the inlet for the polymer to the location of the discharge for the polymer, and the gas in the upper chamber is hotter in the area of the upper chamber adjacent to the inlet for the hot polymer than in the area of the upper chamber adjacent to the discharge location of the cooled polymer. At least two gas outlets are defined by the upper chamber and a weir baffle is used to separate an upper chamber zone containing the hotter gas from the balance of the upper chamber. Hotter gas is then discharged through an outlet communicating with the upper chamber zone containing the hotter gas.

DETAILED DESCRIPTION OF THE PREFERRED EMBODIMENT

Figure 1:
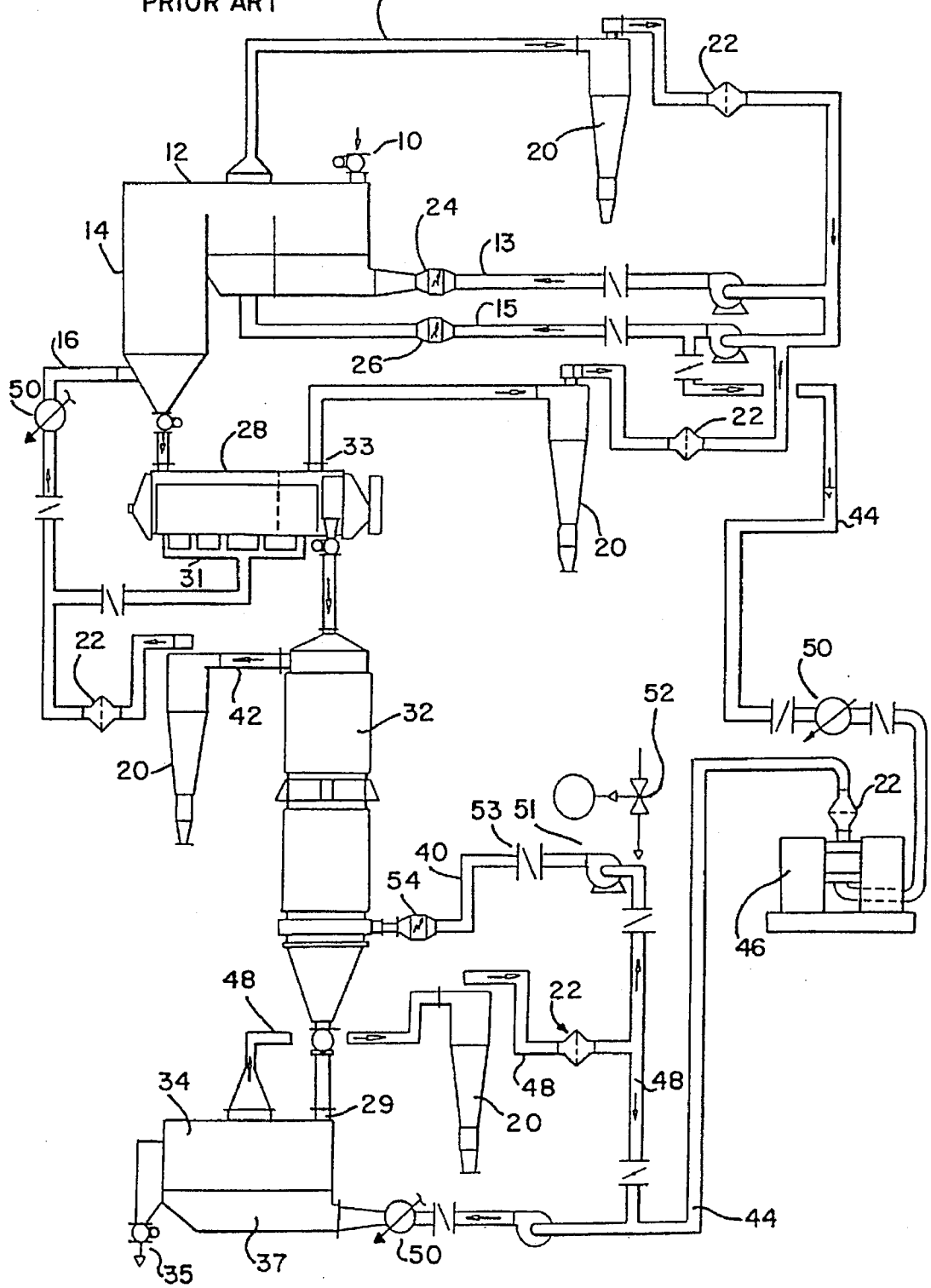
FIG. 1 is a schematic illustration of a prior art system for solid phase polymerization wherein a fluid bed cooler is employed.

The polymerization system shown in FIG. 1 comprises a feed inlet 10 for receiving cold amorphous polymer material and for delivering the material to fluid bed crystallizer 12. Hot gases are introduced through conduits 13 and 15 to achieve heating and agitation of the polymer while the polymer is being moved from the input end to the output end of the crystallizer.

The fluid bed unit 12 is preferably of the type manufactured by Hosokawa Bepex Corporation. Air or other gas is introduced into the unit 12 for achieving fluidization and heating of the polymer and this results in agitation and progression of the polymer through the unit from the entry end to the discharge end. The agitation achieved by the fluidizing operation insures heat transfer to the polymer product whereby the product will be heated to the desired temperature for crystallization.

Stripper column 14 receives the crystallized material from the output end of the crystallizer 12. In conventional fashion, hot air, nitrogen, or other gases are introduced to the hopper/dryer through conduit 16. These gases, as well as the hot gases from the crystallizer 12 are passed through conduit 18 to conventional cleaning and filtering equipment 20 and 22 (also used in other parts of the system) whereby the gases may be recirculated after passing through heaters 24 and 26 positioned at the ends of conduits 13 and 15. The unit 20 may comprise a cyclone separator and the unit 22 a swing cartridge filter.

Preheater/post crystallizer/annealer unit 28 is positioned at the outlet of the stripper column 14. This preferably comprises a TORUSDISC® or THERMASCREW® unit of the type manufactured by Hosokawa Bepex Corporation. Such units serve to further heat the crystallized material while agitating the material to achieve post-crystallization and annealing of the polymer product.

The TORUSDISC unit, for example, consists of a stationary horizontal vessel containing a tubular rotor with vertically-mounted double-walled discs. These discs provide approximately 85% of the total heating surface. Other heating surfaces are the rotor shaft and the inner wall of the jacketed vessel trough. As a consideration of literature illustrating the product will reveal, inlet 31 and outlet 33 are provided so that hot gases are adapted to be circulated through the unit. These gases are also adapted to be recirculated to the fluid bed crystallizer 12.

Material is delivered from the unit 28 and to hopper/reactor 32 where the solid phase polymerization takes place in a conventional fashion. Material exiting from the hopper/reactor is then delivered to inlet 29 of fluid bed cooler 34 and, after cooling, is discharged from outlet 35.

In the prior art system shown in FIG. 1, hot gases are introduced to the reactor 32 from conduit 40 and the gases exit through conduit 42. After cleaning, the gases, which still retain substantial heat, are fed to stripper column 14 and unit 28. Some of the gas from line 15, prior to reaching heater 26, is fed through conduit 44 to the fluid bed cooler. A dehumidifier 46 is interposed in conduit 44, and a plenum chamber 37 of cooler 34 receives the gas from conduit 44.

In a typical prior art operation, the gas entering fluid bed cooler 34 is at 110° F. and the gas in conduit 48 exiting from the cooler is at 195° F. As illustrated, the gas entering the fluid bed cooler comprises a combination of gas from conduit 44 and conduit 48, and since the latter gas is initially too hot, some cooling must be achieved. This can be done only by insuring that the gas in conduit 44 is sufficiently cool to bring the temperature of the gas from conduit 48 down sufficiently, or cooling means 50 must be employed to cool the combination before entry into the cooler 34.

The example of a prior art system shown also involves the need for gas entering reactor 32 through conduit 40 at a temperature of 410° F. This gas consists of recirculated gas from conduit 48 and make-up gas from inlet 52. To achieve the necessary temperature level, the gas must be heated considerably by means of heater 54 before entering the reactor 32 from conduit 40. Blower 51 and damper 53 are used for controlling the gas flow in line 40.

In a typical system, 110,000 pounds per hour of gas at 110° F. are fed to fluid bed cooler 34 and an essentially equal amount exits from the cooler at 195° F. The reactor 32 requires an input of 20,700 pounds per hour and all of this gas, plus any make-up gas must be heated to 410° F. It has been determined that 1.113 million BTU's per hour is required to achieve this heat input.

The balance of the gas exiting from cooler 34 into conduit 48 (89,300 pounds per hour) is supplemented by 20,700 pounds per hour of gas at 110° F. from conduit 44. Considerable additional cooling is therefore required to reduce the larger amount of gas from 195° F. to the necessary input temperature of 110° F. Specifically, 1.898 million BTU's per hour is required to be removed in the cooling means 50 to achieve the cooling.

Figure 2:
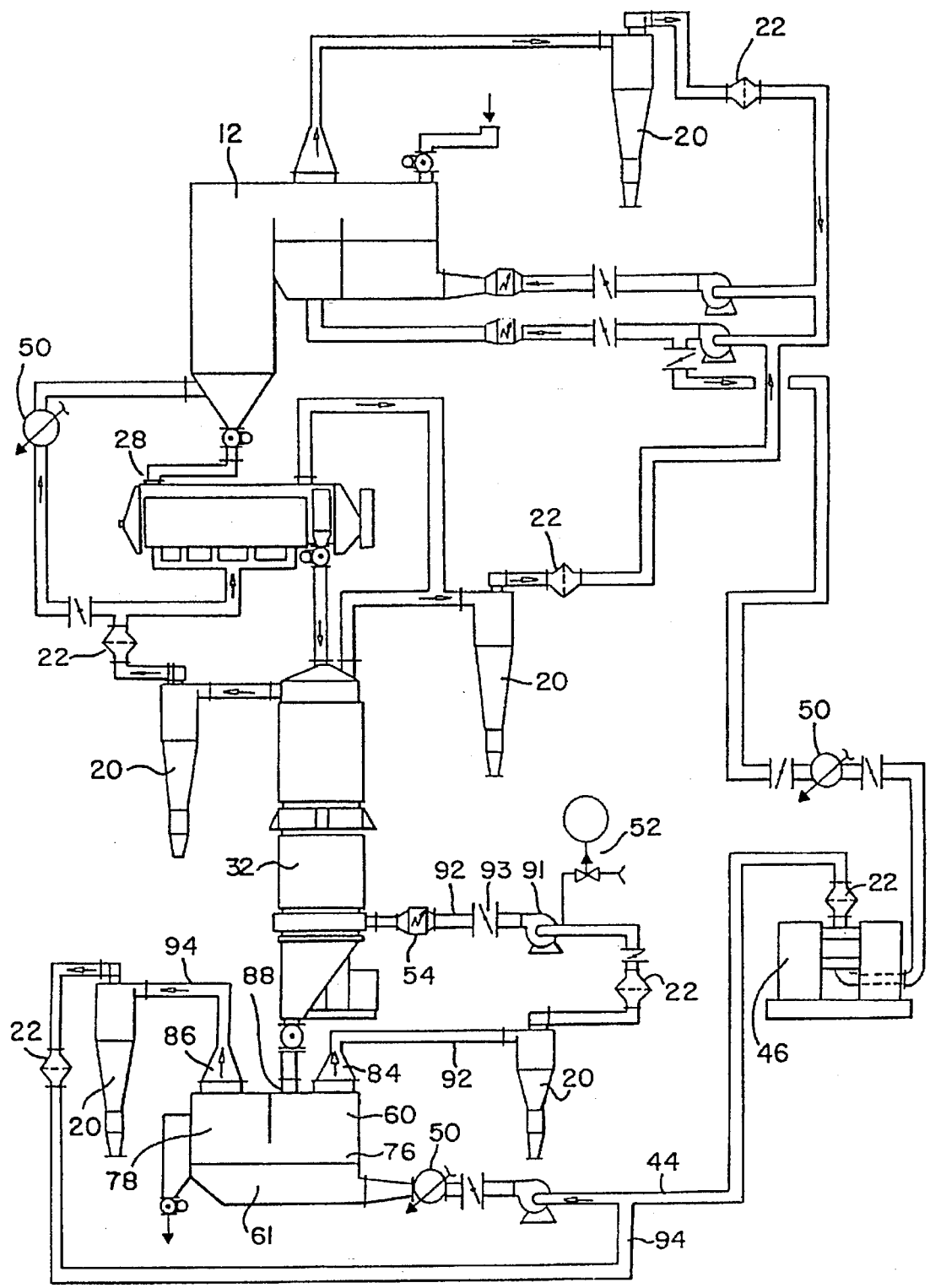
FIG. 2 is a schematic illustration of a system for solid phase polymerization wherein the fluid bed cooler is characterized by the features of this invention.

FIG. 2 illustrates a system generally comparable to that of FIG. 1 from the standpoint of the crystallizer 12, unit 28 and reactor 32. The system differs with respect to the structure and operation of the fluid bed cooler 60 used in the system.

Figure 3:
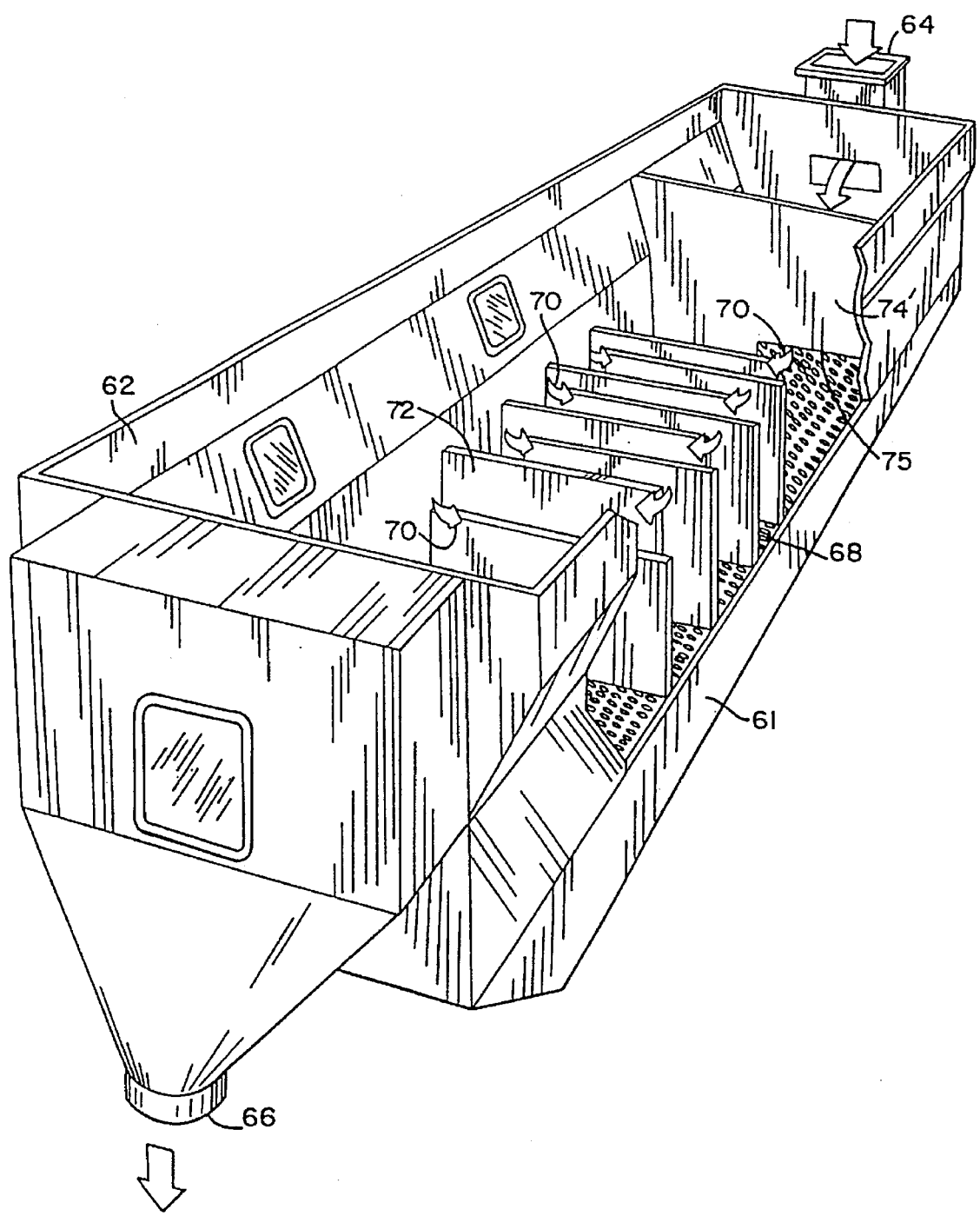
FIG. 3 is a perspective view of a fluid bed cooler suitable for use in the practice of the invention.

In particular, the fluid bed cooler 60 shown in greater detail in FIG. 3 comprises a housing 62 defining inlet 64 and outlet 66 for the polymer being treated. The polymer is moved over the perforated screen or bubble cap-type gas distributor 68 and cool gas is delivered from plenum 61 through the perforations for contact with the hot polymer whereby the polymer is agitated and cooled as it passes through the cooler.

Figure 4:
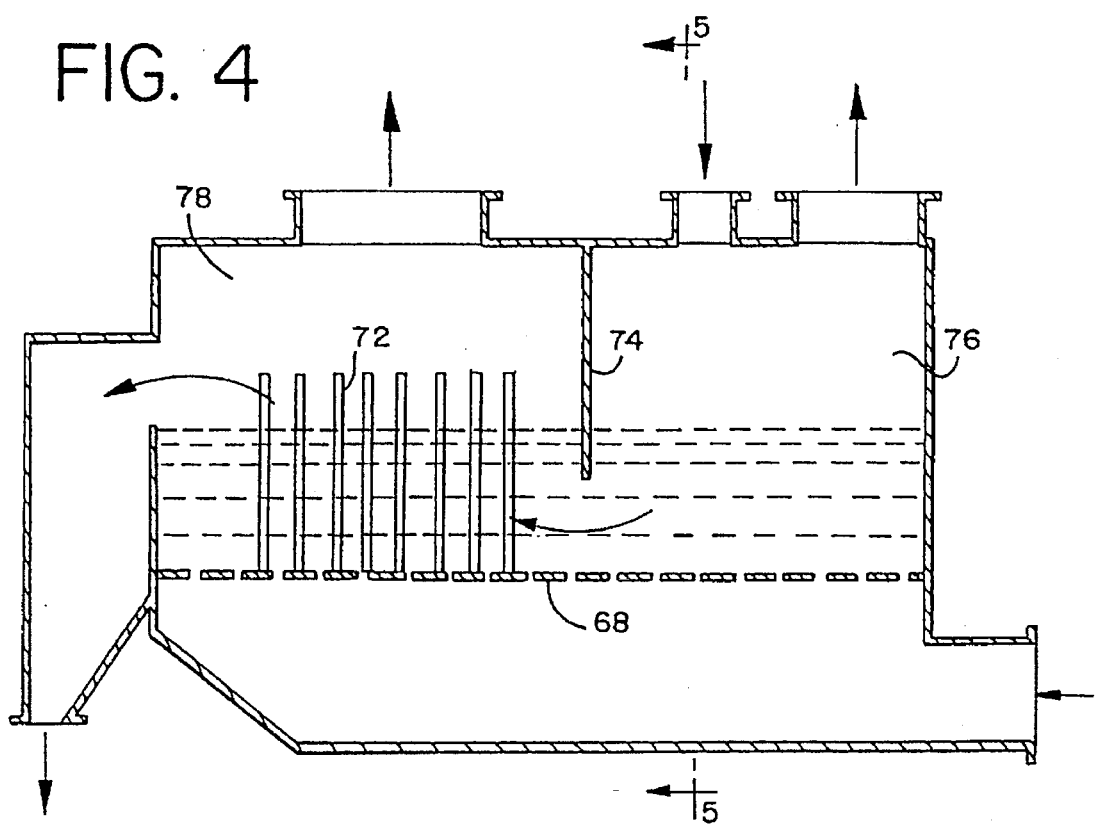
FIG. 4 is a schematic side elevational view of a fluid bed cooler of the type employed in the practice of the invention.

As is illustrated by arrows 70, the polymer is typically directed around baffle plates 72 to minimize short-circuitry and backflow of solids and maximize opportunity for uniform exposure of all of the polymer granules to the cooling gas. In addition, and in accordance with this invention, FIG. 4 illustrates an underflow weir 74 is provided for dividing the cooler housing into separate chambers 76 and 78.

The underflow weir 74 extends to the top of the cooler. Separate gas exhausts 84 and 86 are provided for chambers 76 and 78 and the weir therefore operates to divide the gas exiting the chamber. Specifically, gas bubbling through the polymer in the chamber 76 will be discharged through exhaust 84 and the balance of the gas will be discharged from chamber 78 through exhaust 86. Polymer enters cooler 60 through inlet 88 and is discharged at outlet 90. The polymer thus enters chamber 76 and since it has the highest temperature at this time, the gas discharged from chamber 76 is quite hot. On the other hand, the polymer moving past weir 74 is considerably cooler and therefore the gas discharged from chamber 78 is at a lower temperature.

The system of the invention utilizes this difference in gas discharge temperatures to achieve improved operating efficiency. Thus, the gas from exhaust 84 is passed by means of blower 91 and damper 93 through conduit 92 directly to reactor 32. Heater 54 raises the temperature of this gas (as well as that of any necessary make up gas) to the degree required but this is considerably less of a burden than with a conventional system.

The gas exhausted from chamber 78 is, on the other hand, delivered through conduit 94 for return to fluid bed cooler 60. This gas is combined with gas from line 44 and is passed through cooling means 50 to achieve the desired temperature level. Although a cooling means is required, the burden is considerably less than required in a conventional system.

In an operation of the same type as described with the operation of FIG. 1, 20,700 pounds per hour of gas exits from exhaust 84 of the chamber 76 at 275° F. Only 0.699 million BTU's per hour, a 37% reduction when compared with the conventional system, are required to raise the temperature to the level of 410° F. required for the reactor 32.

The amount of gas obtained from chamber 76 is calculated to correspond to the input needed for reactor 32. In a typical system, the cooler 34 may have a bed of 70 square feet and the chamber 76 may be formed over a 15 square foot area. The amount of hot gas removed may, of course, be varied depending on the position of the weir, and any suitable mechanical means, such as a guide slide for the weir combined with a rack and pinion arrangement or piston and cylinder, may be used for weir adjustment. The amount of gas exhausted may also be controlled by setting of blower dampers.

Gas at a temperature of 175° F. is discharged through exhaust 86 at 89,300 pounds per hour. Only 1.451 million BTU's per hour are required to be removed in the coolng means 50 to lower the temperature of this gas (combined with 20,700 pounds per hour from line 44) to the 110° F. level required for the fluid bed cooler 60. This constitutes a 24% reduction when compared with the conventional system described.

Figure 5:
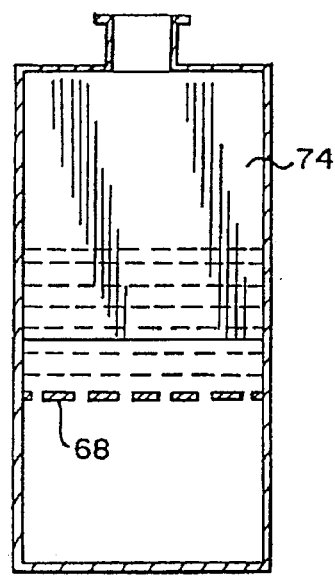
FIG. 5 is a schematic elevational view of a weir structure for the cooler.
Figure 6:
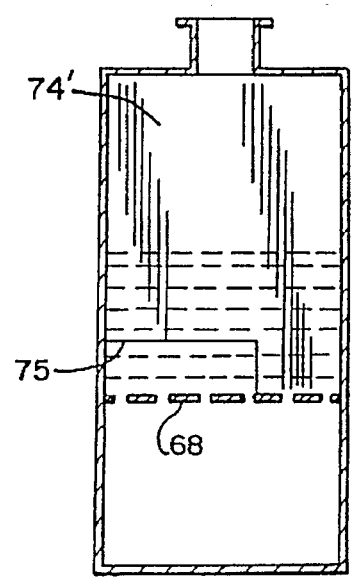
FIG. 6 is a schematic elevational view of an alternative form of weir structure.

FIGS. 5 and 6 illustrate examples of specific weir arrangements operating in accordance with the invention. As illustrated, the bottom edge of the weir is spaced from the perforated gas distributor 68 to permit underflow passage of polymer from one chamber to the other. The weir 74' of FIG. 6 includes only a partial opening 75 which controls the flow rate of the polymer. Further control can be achieved by using removable bars or the like which would permit variations in the size of the openings illustrated.

The method and apparatus of the invention is particularly suited for use with systems employing nitrogen gas since it is most desirable to recycle this gas to minimize operating costs. Even where air is used, however, the system allows for recovery of significant heat values from the air removed from chamber 76. The air from chamber 78 may simply be disposed of since the heat value is not significant and atmospheric air may be more efficiently used for mixing with air from line 44.

It will be understood that changes and modifications in the embodiments described may be made without departing from the spirit of the invention particularly as defined in the following claims.

That which is claimed is:

1. In an apparatus for the solid phase polymerization of polymers wherein a cold amorphous polymer is introduced to one or more crystallizers and heated to crystallize the polymer, the crystallized polymer is discharged to a reactor for polymerization of the polymer, and the hot polymer product of the reactor is discharged to a fluid bed cooler for cooling of the polymerized product, said fluid bed cooler including an inlet for the hot polymer and an inlet for the cooling gas, and means for discharging the cooled polymer and the heated gas from the cooler after contact of the gas with the polymer, said cooler including a bed portion in which the polymer moves while in contact with the cooling gas, and an upper chamber collecting heated gas, the temperature of the polymer gradually decreasing from the location of the inlet for the polymer to the location of the discharge for the polymer, and the gas in the upper chamber being hotter in the area of the upper chamber adjacent the inlet for the hot polymer than in the area of the upper chamber adjacent the means for discharging the cooled polymer, the improvement wherein said upper chamber defines at least two outlets to serve as said means for discharging the heated gas, means separating an upper chamber zone containing the hotter gas from the balance of the upper chamber, and wherein one of said upper chamber outlets communicates with the upper chamber zone whereby the hotter gas is recovered through said one outlet.

2. An apparatus according to claim 1 including a gas distributor comprising a perforated screen or bubble cap-type, and including a plenum chamber extending beneath said gas distributor through which said cooling gas enters the cooler, said cooling gas moving upwardly through said gas distributor and through the polymer supported thereon and into said upper chamber, and a weir extending downwardly in said upper chamber to a position spaced upwardly from said gas distributor to permit movement of polymer over the gas distributor while said weir serves as said means for separating said zone of said upper chamber from the balance of the upper chamber.

3. An apparatus according to claim 2 wherein hot gas is used to provide at least part of the heat input for said reactor, and including a conduit extending from said one outlet to said reactor and means at said reactor for using the heat value of said hotter gas to assist in heating the gas entering the reactor.

4. An apparatus according to claim 3 including means for heating said hotter gas prior to delivery to said reactor.

5. An apparatus according to claim 3 including a conduit extending from another of said outlets to said inlet for said cooling gas whereby the balance of said gas is recirculated to said cooler.

6. An apparatus according to claim 5 including means for cooling said heated gas prior to delivery to said inlet for said cooler.

* * * * *